April 24, 1951         H. A. TOWNER         2,550,174
PROCESS OF BONDING TWO METAL MEMBERS WITH
AN APERTURE THEREIN
Filed Oct. 3, 1947

INVENTOR.
Harold A. Towner
BY
Spencer Hardman and Ehr
Attorneys

Patented Apr. 24, 1951

2,550,174

UNITED STATES PATENT OFFICE 2,550,174

PROCESS OF BONDING TWO METAL MEMBERS WITH AN APERTURE THEREIN

Harold A. Towner, Dayton, Ohio, assignor to General Motors Corporation, Dayton, Ohio, a corporation of Delaware Application October 3, 1947, Serial No. 777,748

1 Claim. (Cl. 29—148)

This invention is related in a general way to the fabrication of refrigerating apparatus but more particularly to the making of enclosed containers requiring one or more apertures through the inner and outer walls thereof.

In sealed containers, such as are used, for example, as the evaporators of refrigerating machines, it is often desired to have one or more apertures extending through both the inner and outer walls thereof, particularly for receiving fastening means, such as bolts, screws or rivets which may be used to support brackets or shelves. These apertures have been made by piercing both the inner and outer walls and relying upon the bonding material to properly seal the inner and outer walls together surrounding the apertures to prevent the escape of fluid or gas from the container. It has been found that the bonding operation sometimes does not completely seal the walls together around the aperture as required. It is then necessary to reoperate such containers at considerable expense after the leaks are revealed by testing every container made. However, even when containers do not leak when tested, moisture may enter any unsealed crevices around the apertures and repeatedly freeze there causing enlargement of the crevices occasionally in sufficient amount to cause leaks.

It is an object of my invention to provide a process for making sealed apertures extending through the inner and outer walls of a container which is not likely to leak or fail regardless of its location.

It is another object of my invention to provide a process for making a sealed aperture which also positively holds the inner and outer walls together during the bonding operation and afterward.

It is another object of my invention to provide a process for sealing an eyelet provided in the walls of a container.

These objects are attained by providing an aperture larger than desired in one of the walls or sheets of the container and preferably extruding an eyelet from the other wall or sheet through the aperture and spinning the eyelet over on the opposite side of the aperture wall or sheet. Preferably this is done prior to the bonding operation and then the bonding material is applied around the spun-over flange of the eyelet so that it will be sealed during the bonding operation. If desired, the eyelet may be tapped to receive a screw.

Further objects and advantages of the present invention will be apparent from the following description, reference being had to the accompanying drawings, wherein a preferred form is clearly shown.

Figure 1:
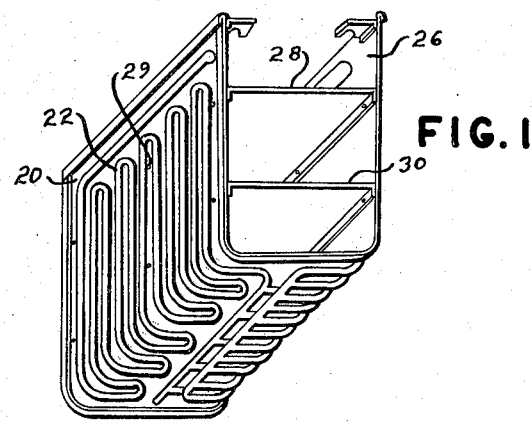
Fig. 1 is a cabinet projection of a container used as a refrigerant evaporator having apertures at various points for receiving the fastening means supporting the ice tray shelves.

Referring now to the drawing and more particularly to Fig. 1, there is shown a refrigerant evaporator structure including an outer wall 20 in the form of a thin brass sheet having raised portions 22 extending in a serpentine fashion throughout one-half of the evaporator structure and connecting in parallel circuit relationship with the raised portions 24 upon the opposite side of the structure. Bonded to this outer sheet is an inner brass sheet 26 which clamps over the outer sheet at the edges thereof. Two ice tray shelves 28 and 30 have turned down flanges at their side edges. These flanges have apertures which register with the apertures 29 in one side wall thereof. Fastening means of some suitable type, such as screws, bolts or rivets extend through the flanges and the apertures in the container for supporting the shelves 28 and 30.

Figure 2:
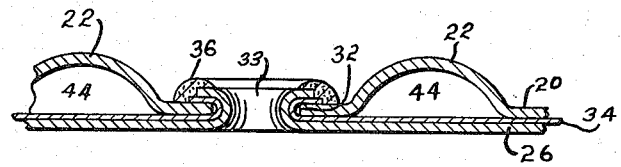
Fig. 2 is a fragmentary sectional view through the assembled parts of the container and an eyelet therein, with the bonding material applied in preparation for the bonding operation.
Figure 3:
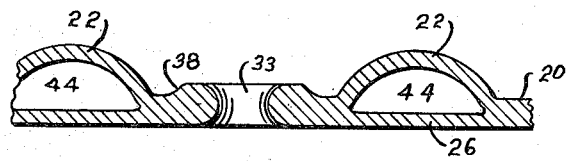
Fig. 3 is a similar sectional view showing the same parts immediately after the bonding operation.

In the manufacture of this or similar structures the outer sheet is formed with raised or depressed portions, such as the portions 22 and an aperture 32 is made at the desired point, either in the same or successive operations. This aperture is preferably made somewhat larger than is desired for the aperture in its final state. The outer sheet 20 and the inner sheet 26 are assembled together with a bonding material, such as phosphor-brass spelter sheet 34 in between as shown in Fig. 2. From the metal of the inner sheet 26 an eyelet 33 is extruded through the aperture 32 and spun over as shown in Fig. 2. Preferably the spelter sheet 34 is carried through the aperture 32 and spun over along with the material of the inner sheet 26 as shown. Thereafter a bonding material in the form of a paste 36 is applied completely around the flange of the eyelet 33 as shown in Fig. 2. This paste is made principally from 60–40 brass powder and a substantially non-fluxing vehicle to hold the particles of the brass powder together. One example of such a paste is made according to the following formula:

|  | Pound |
|---|---|
| Methyl cellulose | 1 |
| Tributyl phosphate | .083 |
| Aerosol OT | .08 |
| Water | 25.8 |
| 60–40 brass powder | 74.5 |

The Aerosol OT is an ester of a sulphonated carboxylic acid. The brass powder contains about 60% copper and 40% zinc. The brass powder as well as the brass spelter sheet likewise of 60% copper and 40% zinc, together with a little phosphorus has a melting point of about 1660° F. The sheets forming the walls of the container are of a higher melting point brass. The paste is dried.

After drying, the container is placed in a furnace with a reducing atmosphere maintained at a temperature between 1700° F. and 1850° F. and kept there until it is heated to a sufficiently high temperature to cause the bonding material and the spelter sheet to melt and braze the sheets 26 and 20 together. Some of the brass powder in the paste 36 melts to form a fillet 38 extending around the eyelet 33 thus sealing the walls 20 and 26 around the aperture formed by the eyelet 33. In addition to providing the brass to form the fillet 38 during the brazing operation, some of the paste protects the portion of the brass powder and the spelter sheet nearest the eyelet from excessive loss of zinc and consequent elevation of its melting point. By virtue of this, the low melting point brass powder and the edges of adjacent portions of the spelter sheet 34 and the outer sheets 20 and 26 nearest the joint surrounding the eyelet 33 are enabled to melt at the temperatures attained to supply molten metal for filling the joint and providing a good fluid-tight bond. Any residue from the paste may be readily brushed away after the brazing or bonding operation, since it is substantially non-fluxing.

The bonded sheets may then be folded into the shape of container desired, such as is shown in Fig. 1. The eyelet may be threaded so that the shelves may be fastened in place by screws, or bolts or rivets may be used which require no threading of the eyelet. The apertures 29 in Fig. 1 are constructed similar to the eyelet 33. The raised portions 22 and 24 provide sealed passages 44 for refrigerant.

While I have described a container as being bonded together by a brazing process in a reducing atmosphere, the container may be made of other materials and may be bonded together by other processes and other bonding materials. In that event, the paste 36 is replaced by a bonding material suitable to the process used for bonding other parts of the container. For example, some form of solder may be used. It is not necessary to extrude the eyelet from one of the walls, although this is preferred, since it requires sealing only on one side. The eyelet mechanically holds together the sheets around the aperture during the brazing operation so that a good bond is obtained.

While the form of embodiment of the invention as herein disclosed, constitutes a preferred form, it is to be understood that other forms might be adopted, as may come within the scope of the claim which follows.

What is claimed is as follows:

The process of bonding together two metal members which are to have a sealed aperture therein which includes forming an aperture in one of the members larger than the aperture desired, assembling the members together with a sheet of bonding material extending throughout the area between the assembled members, extruding an eyelet from the other of the members and the bonding material through said aperture for lining said aperture and holding the members and the sheet of bonding material together, applying a bonding material around the eyelet, and heating the assembled members at a sufficient temperature for a sufficient length of time to cause the bonding material to bond the members together.

HAROLD A. TOWNER.

REFERENCES CITED

The following references are of record in the file of this patent:

UNITED STATES PATENTS

| Number | Name | Date |
|---|---|---|
| 108,001 | Bourke | Oct. 4, 1870 |
| 487,939 | Smith | Dec. 13, 1892 |
| 692,365 | Safford | Feb. 4, 1902 |
| 1,201,539 | Arey | Oct. 17, 1916 |
| 1,804,624 | King | May 12, 1931 |
| 2,042,507 | Collins | June 2, 1936 |
| 2,113,060 | Sandberg | Apr. 5, 1938 |
| 2,232,176 | Guthrie | Feb. 18, 1941 |